US007693787B2

(12) United States Patent  
Provinse

(10) Patent No.: US 7,693,787 B2  
(45) Date of Patent: Apr. 6, 2010

(54) SYSTEM AND METHOD FOR ACCOUNT RECONCILIATION

(75) Inventor: Shirley J. Provinse, Bethesda, MD (US)

(73) Assignee: American Express Travel Related Services Company, Inc., New York, NY (US)

( * ) Notice: Subject to any disclaimer, the term of this patent is extended or adjusted under 35 U.S.C. 154(b) by 1564 days.

(21) Appl. No.: 09/943,438

(22) Filed: Aug. 27, 2001

(65) Prior Publication Data

US 2002/0026416 A1 Feb. 28, 2002

Related U.S. Application Data

(60) Provisional application No. 60/228,236, filed on Aug. 25, 2000.

(51) Int. Cl.
*G06Q 40/00* (2006.01)
(52) U.S. Cl. ............... 705/39; 705/5; 705/33; 705/35
(58) Field of Classification Search ............ 705/35–40, 705/5, 33
See application file for complete search history.

(56) References Cited

U.S. PATENT DOCUMENTS

| | | | |
|---|---|---|---|
| 5,093,787 A | 3/1992 | Simmons | |
| 5,134,564 A * | 7/1992 | Dunn et al. | 705/33 |
| 5,521,363 A | 5/1996 | Tannenbaum | |
| 5,598,477 A | 1/1997 | Berson | |
| 5,649,115 A | 7/1997 | Schrader et al. | |
| 5,704,044 A | 12/1997 | Tarter et al. | |
| 5,740,271 A | 4/1998 | Kunkler et al. | |
| 5,783,808 A | 7/1998 | Josephson | |
| 5,832,451 A | 11/1998 | Flake et al. | |
| 5,832,460 A | 11/1998 | Bednar et al. | |
| 5,859,419 A | 1/1999 | Wynn | |
| 5,903,881 A | 5/1999 | Schrader et al. | |
| 5,903,882 A | 5/1999 | Asay et al. | |
| 5,948,040 A | 9/1999 | DeLorme et al. | |
| 5,963,925 A | 10/1999 | Kolling et al. | |

(Continued)

FOREIGN PATENT DOCUMENTS

AU 741608 11/1999

(Continued)

OTHER PUBLICATIONS

Layne, R., "First Interstate Sees Big Payoff in Account Reconcilement Software", American Banker, New York, N.Y.: Nov. 15, 1989.*

(Continued)

*Primary Examiner*—Olabode Akintola
(74) *Attorney, Agent, or Firm*—Snell & Wilmer L.L.P.

(57) ABSTRACT

An account reconciliation system having a particular usefulness in the reconciliation of centrally billed accounts and more specifically, in the reconciliation of centrally billed accounts in the travel industry is provided. The system and methods of the present invention expand on the traditional match/non-match techniques and provide complete transaction management for every item on a client's account. In another sense, reconciliation is redefined to include each and every transaction on an account regardless of its reconciliation status, i.e., matched, unresolved, pending, etc. Consequently, the present invention reconciles the client's account to the account balance.

28 Claims, 10 Drawing Sheets

U.S. PATENT DOCUMENTS

| | | | |
|---|---|---|---|
| 5,991,750 A | 11/1999 | Watson | |
| 6,006,204 A * | 12/1999 | Malcolm | 705/30 |
| 6,047,269 A | 4/2000 | Biffar | |
| 6,068,194 A | 5/2000 | Mazur | |
| 6,072,870 A | 6/2000 | Nguyen et al. | |
| 6,119,105 A | 9/2000 | Williams | |
| 6,128,602 A * | 10/2000 | Northington et al. | 705/35 |
| 6,178,409 B1 | 1/2001 | Weber et al. | |
| 6,189,785 B1 * | 2/2001 | Lowery | 235/379 |
| 6,202,054 B1 | 3/2001 | Lawlor et al. | |
| 6,301,379 B1 | 10/2001 | Thompson et al. | |
| 6,442,526 B1 * | 8/2002 | Vance et al. | 705/5 |
| 7,117,172 B1 * | 10/2006 | Black | 705/35 |
| 2002/0007327 A1 * | 1/2002 | Steury et al. | 705/34 |
| 2003/0191710 A1 | 10/2003 | Green et al. | |
| 2003/0208440 A1 * | 11/2003 | Harada et al. | 705/39 |
| 2005/0027617 A1 * | 2/2005 | Zucker et al. | 705/26 |

FOREIGN PATENT DOCUMENTS

| | | |
|---|---|---|
| GB | 2345775 | 7/2000 |
| WO | WO 00/38095 | 6/2000 |

OTHER PUBLICATIONS

"Travel Management Services", Federal Information & News Dispatch, Inc (FIND), Commerce Business Daily, Washington: Feb. 22, 1999.*

Non-Final Rejection mailed Mar. 6, 2008 in U.S. Appl. No. 11/619,280 by Shirley Provinse.

Final Rejection mailed Aug. 6, 2008 in U.S. Appl. No. 11/619,280 by Shirley Provinse.

Kreminec, Kathleen; "Reconciling Accounts the Automated Way", Best's Review; Jan. 1990; 90,0; ABI/INFORM Global p. 82.

* cited by examiner

SYSTEM AND METHOD FOR ACCOUNT RECONCILIATION

CROSS REFERENCE TO RELATED APPLICATIONS

The present application claims the benefit of and priority to U.S. Provisional Patent Application No. 60/228,236 filed Aug. 25, 2000, the entire contents of which are incorporated herein by reference.

FIELD OF INVENTION

The invention relates generally to account reconciliation and, in particular, to travel "central bill" account reconciliation. More specifically, the invention relates to a system and method for identifying transactions on a centrally billed travel account and reconciling to the account balance.

BACKGROUND OF THE INVENTION

Central billing is a common accounting practice often used by large employee-based companies. In general, central billing typically occurs when a card vendor assigns a common account billing number that can be used by multiple employees or authorized personnel to charge authorized items to the company. The company usually receives a single bill at the end of the billing cycle for all its employees' charges.

In the travel industry, central billing is especially popular and a service offered by most card vendors. As an example, Company A may request a charge card company to assign a Company account number to be used for all of Company A's charged airline tickets or other travel related charges. In this manner, when an authorized person from Company A requests a ticket from Company A's travel agency, the charges will be automatically placed on the Company account instead of the individual's account. Charges throughout a specified billing cycle, e.g., monthly, accrue on the Company's account number for numerous employees and tickets. At the end of the billing cycle, a single bill for all the charges made using the Company account number as the form of payment is usually remitted to the Company for payment. Most companies enjoy the simplicity of receiving one bill for payment at the end of each billing cycle instead of having literally hundreds of individual bills remitted to their travelers.

Central billing, however, creates numerous problems in the area of account reconciliation. Often times the bill recipient, e.g., Company A, includes in its contract with its travel vendor the non-trivial requirement to reconcile the monthly statements issued by its card vendor for its centrally billed account(s): i.e., identify each charge and credit on each account, calculate the total amount of the charges determined to be correct and ready to be paid, and properly apply applicable rebates and fees. In addition, the central billing reconciliation process often escalates as the volume of individual items on each account increases.

The traditional account reconciliation process for centrally billed accounts is a "match/non-match" approach. Continuing with the above example, the travel agency typically receives an electronic copy of the card statement listing all the travel transactions (charges and credits) billed during the cycle. The travel agency conducts a one-time match against Company A's charges and Company A's travel records typically based on a ticket number and creates a list of matched items and a list of unmatched items. Matched items are subsequently forwarded to the Company on a report, which includes the identifying accounting information, such as the travel authorization number, employee ID, project code, or the like captured in the employees' original travel records.

The unmatched items, which include any charge records that do not have corresponding travel records, e.g., tickets that were voided after the day of issue, modifications to tickets made at the airport, and data entry errors (e.g., misspellings), remain unidentified. Typically, companies refuse to pay for unmatched items because many times the company is unable to establish a proper explanation of the charge, e.g., which employee charged the travel ticket. The bill reconciler must then research each unmatched item in order to explain the charge and resubmit for payment. In a voluminous industry, such as the travel/ticket industry, this research process is cumbersome and very time consuming. In addition, it is often the case that the reconciler is simply unable to identify the item when the airline provides incomplete data. Thus, the unmatched item is left unpaid and eventually becomes a write-off for the card vendor.

Most credit card companies have moved to electronic credit card processing which often further complicates central bill account reconciliation. For example, if an authorized employee from Company A purchases a travel ticket from the travel agency on Monday using the centrally billed card account, the card charge is processed electronically and nearly immediately by the card company. So on Tuesday, Company A's travel company shows the record of the ticket issued and its charge card company shows receipt of the charge record. At the end of each week, travel agencies submit reports of ticket sales to the airlines through the Airline Reporting Corporation (ARC). ARC oversees settlement processing for all airlines and charge card vendors to include an accounting of the number of tickets issued and dollars charged. Until Friday of each week, the travel agency has the opportunity to void the travel record/ticket from Company A's ARC report as if it never existed; however, it cannot similarly void the transaction on the Company's central bill account. If the travel agency voids Company A's ticket on Thursday, for example, the charge on the Company's credit card account, which has already been processed, will remain. At the end of the week, when the travel agency submits its sales report to ARC, ARC sees that a ticket has been voided and generates a correcting credit to the Company's central bill account for the voided ticket. When these transactions appear on the Company's account, they are unmatched items. In other words, a charge record for Company A is presented for matching to a ticket record for a ticket that was issued in week one, but which no longer exists. The credit for the voided ticket, which was generated by ARC in week two, is also presented with no matching charge record. In the event that these transactions take place within the established billing cycle of Company A, a chance exists that these debit and credit transactions will appear together on the same month's central bill account. However, in about at least twenty-five percent of the cases, the debit and credit will not appear on the same monthly statement, thus further complicating the reconciliation process.

Additionally, many credit card vendors, like American Express® and Diners Club®, do not permit "carry-over" balances and all charges during the billing cycle are due upon receipt of the bill. In this sense, the Company is asked to pay all the transactions on their account, whether or not a reconciled match is made for each one. Thus, if the debits and credits do not appear in the same cycle, the company may be billed for an item which has been voided, returned, or otherwise not received. Many times, this "overbilling" results in a charge dispute. Therefore, while traditional reconciliation processes generally match a high percentage of the items, this approach is still inadequate. Even a small percentage of unmatched items can equate to a large number of unmatched and unresolved entries that must be researched and corrected.

A system and method for account reconciliation that includes a traditional matching technique to identify and resolve matched items, as well as a tracking, research and correction technique to identify and resolve the unmatched items is needed. Moreover, a system and method for account reconciliation that identifies, tracks and reconciles pending transactions to the account balance, including all accounting items whether matched or unmatched, is needed.

SUMMARY OF THE INVENTION

The present invention provides an improved system and method for account reconciliation that expands and builds on traditional matching techniques. In particular, the present invention provides an account reconciliation system and technique to reconcile each entry on an account, irrespective of whether the item is a matched or unmatched entry.

The system includes a client side and a server side with a communication channel that joins the sides together and includes an accounting database capable of receiving and storing data relating to an account. A software program may also be included that includes programming to automatically match the received data and automatically compile the matched data and remaining unmatched data. A user is permitted to view the unmatched data and direct the system to search the database and accept a match. A user is also permitted to edit the unmatched data. The system further includes programming to generate a reconciliation report comprising a verification that the account is reconciled to the account balance.

BRIEF DESCRIPTION OF THE DRAWINGS

These and other features, aspects and advantages of the present invention may be best understood by reference to the following description taken in conjunction with the accompanying drawings in which like numerals represent like elements.

DETAILED DESCRIPTION OF EXEMPLARY EMBODIMENTS

Figure 1A:
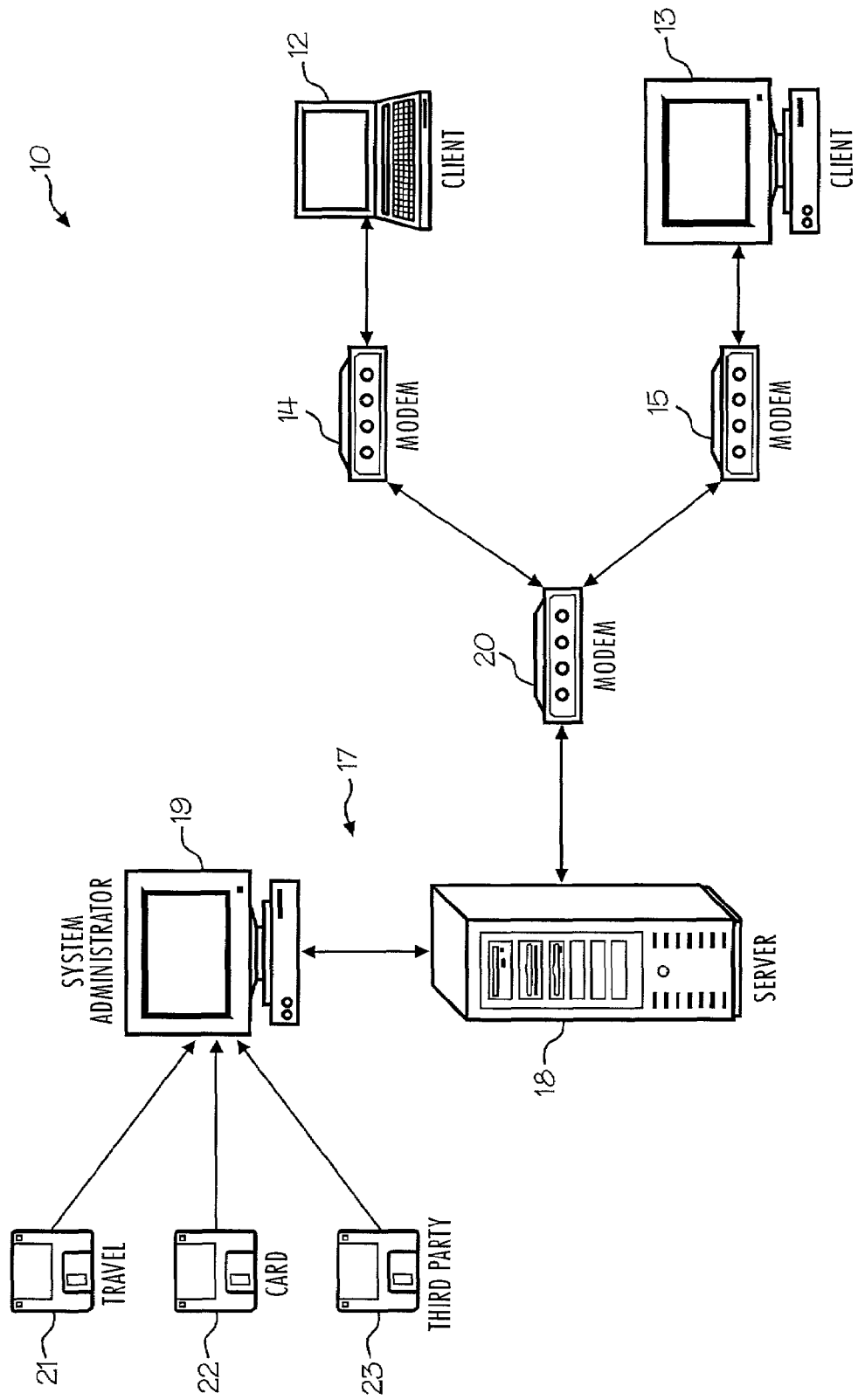
FIG. 1a is an exemplary diagram of a computer-based architecture that can be used to implement an account reconciliation system of the present invention.

The present invention provides an improved system and method for account reconciliation having particular usefulness in the reconciliation of centrally billed accounts. Although the system and methods disclosed herein may be suitable for reconciliation of centrally billed accounts in a variety of applications, the present invention is conveniently described with reference to the travel industry, and more particularly to account reconciliation of travel records and charge records. In addition, reference is made throughout to the travel ticket industry; however, it should be recognized that the present invention has equal application to various other industries within the travel agencies' domain, such as lodging and rental car account reconciliation and outside of the travel domain, such as office supplies, computer access and/or expenses that could be consolidated into centrally billed accounts.

In general, the present invention expands the traditional match/non-match technique for account reconciliation. In other words, simply matching debits to credits in the traditional approach routinely reconciles the majority of the items on an account, and hence, the traditional approach is maintained in the initial steps of the present invention. The present invention then goes beyond simply identifying matched and unmatched items and provides complete management of every item on an account. In another sense, the present invention reconciles the entire account balance through management of each item on the account regardless of its reconciliation status.

The present invention redefines the traditional approach of determining when an item is ready for payment by recognizing that clients generally pay according to their own definitions of a "match". Traditional approaches generally do not sufficiently consider the quality of data used to determine a match. Often times what appears to match may not meet the stricter reconciliation requirements set by the client. The present invention permits flexibility in the reconciliation process according to each client's criteria, such as, for example, accounting criteria. Clients can also set guidelines to indicate when their reconciliation requirements are met, to indicate that they are willing to remit payment. In other words, one client may be satisfied that an item is ready for payment under certain conditions which are quite different from the conditions established by another client.

The system and method of the present invention identifies most the problems that keep entities from paying and provides a solution and opportunity to correct them, by tracking each one until it is sufficiently resolved, i.e., reconciling the account balance. This technique ultimately results in resolution of all of the account items, because unmatched items are not forgotten, as with traditional techniques, but are instead tracked until each item is removed from the outstanding account balance. By tracking and managing each item on a client's centrally billed card account, the reconciler and the client are ensured that ultimately all the items on the account will be resolved. Reconciliation to the account balance (i.e., the tracking of all open items on the account) results in less write-offs due to nonpayment of unreconciled account balances, and the research and correction of unmatched transactions results in a simpler bill reconciliation process with less margin for dispute. One skilled in the art will appreciate that resolution of "all" the account items may include various tolerance levels for resolutions or predetermined numbers or levels of matched items implemented by the system and/or requested by the client.

Account Reconciliation System

Exemplary system components are provided below to facilitate understanding of the invention and its best mode. It should be recognized that various other components may be used without departing from the spirit of the invention as intended. For the sake of brevity, conventional techniques for signal processing, data transmission, signaling and network control, and other functional aspects of the systems (and components of the individual operating components of the systems) may not be described in detail herein. Furthermore, the connecting lines shown in the various figures contained herein are intended to represent exemplary functional A relationships and/or physical couplings between the various elements. It should be noted that many alternative or additional functional relationships or physical connections may be present in a practical network communications system.

FIG. 1a is a simplified diagram illustrating an exemplary computer-based architecture 10 that can be used to implement the account reconciliation system in accordance with the present invention. The account reconciliation system may be implemented in a commonly known client/server architecture having a client side 12, 13 and a server side 17. The client side 12, 13 typically includes a computing device that includes, in one embodiment, a display and input means such as a keyboard, mouse, kiosk, personal digital assistant, handheld computer, portable computer and/or cellular phone. As illustrated in the present example, client 12 is a portable computer and client 13 is a personal computer. It should be realized that two clients are illustrated for exemplary purposes only and that any number of clients may be included in the architecture. The client typically includes an operating system (e.g., a version of Windows (Windows NT, Windows 98/2000/Millenium)), as well as various conventional support software and drivers typically associated with computers, computing devices, and the like. For example, the client side generally includes a modem (e.g., 56K baud) 14, 15 for facilitating access to a network.

The server side 17 may broadly include a server 18, a system administrator 19, and a modem pool 20, electrically linked together. Modem pool 20 send electrical signals to server 18 and is used to transceive electrical signals from the client modems 14, 15. The modem pool 20 may provide some protocol conversion to optimize modem performance, eliminate handoff retrain, and provide precise setting of transmit levels. The server side 17 typically includes a computing device having a processor for processing digital data, a memory coupled to the processor for storing digital data, an input digitizer coupled to the processor for inputting digital data, and an application program stored in the processor. Server 18 may be implemented as any suitable processing server, in an exemplary embodiment, including tables, objects, triggers, and stored procedures. For example, a Microsoft® SQL 6.5 Server database has been successfully utilized as server 18.

As will be appreciated, system administrator 19 includes a computing device that preferably includes a display and input means such as a keyboard, mouse, kiosk, personal digital assistant, handheld computer, portable computer and/or cellular phone to facilitate communications with server 18. System administrator 19 further preferably includes a suitable operating system stored thereon, e.g., Microsoft® NT Workstation. System administrator 19 suitably receives data which is loaded onto one or more databases of server 17. For example, with respect to one particular application relating to the travel industry, travel data 21, card data 22, and third party data 23 are electronically loaded and stored in server 17. Third party data 23 may or may not be included in the system and generally includes travel and card data from vendors not associated with travel data 21 and card data 22. For example, in one specific embodiment, American Express® travel data, American Express® card data, and non-American Express (third party) card and travel data may be electronically received and stored in the server.

Figure 1B:
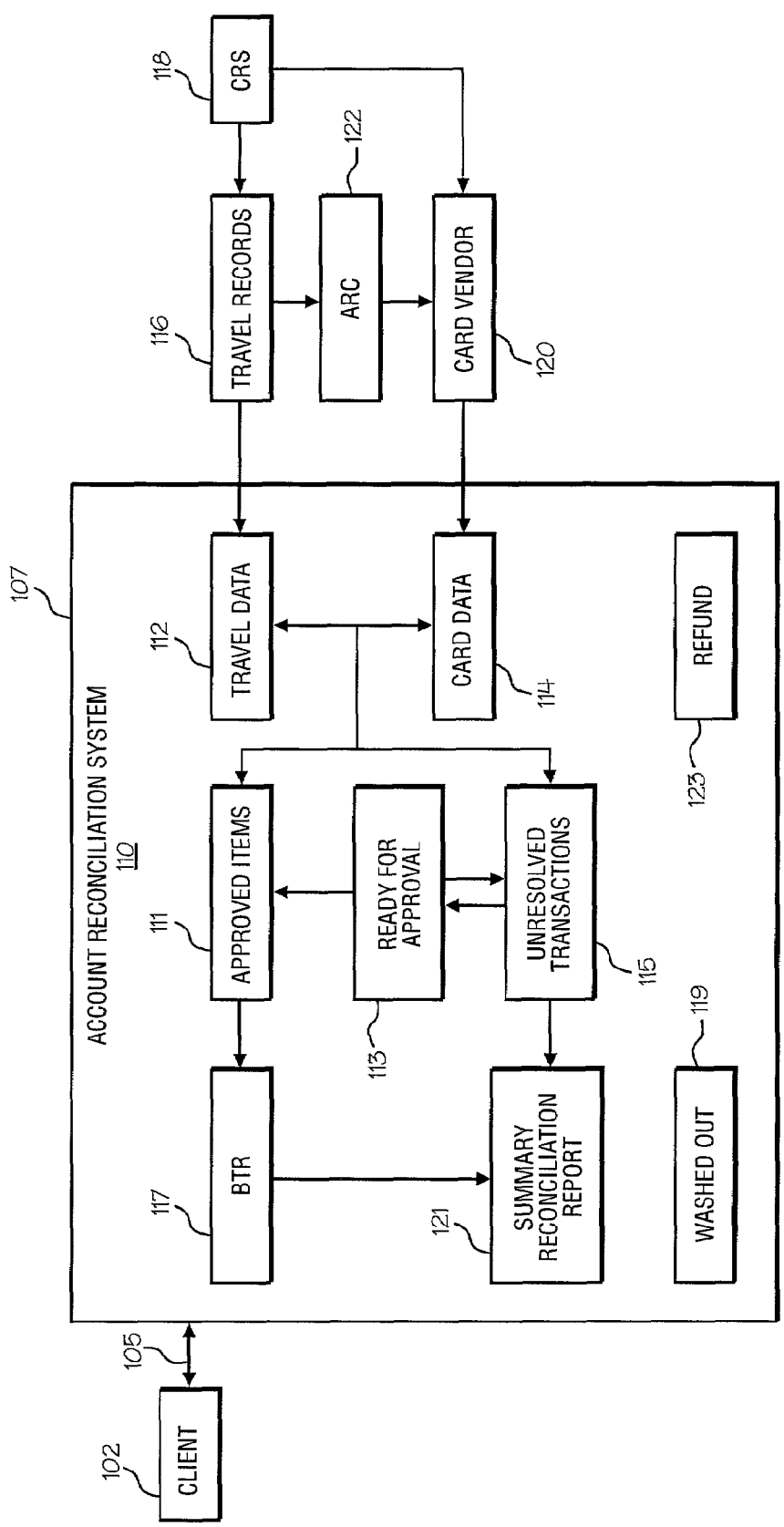
FIG. 1b is an exemplary top level block diagram illustrating an environment in which an account reconciliation system can function and operate according to one embodiment of the present invention.

FIG. 1b is a top level block diagram illustrating an environment in which an account reconciliation system in accordance with the present invention can function and operate. The account reconciliation system (hereinafter, referred to as the "system") 110 includes a front end (client) 102 and a back end (server) 107. As those skilled in the art will appreciate, the front end 102 typically includes a computer, computing device, or the like. The back end 107 typically includes a server, such as a host server or other computing system, and a plurality of databases.

In an exemplary embodiment, system 110 includes one or more relational databases, which reside in a data storage medium. Travel or merchant data 112 and financial (card) data 114 are included in the relational databases for each client. One skilled in the art will also appreciate that, for security reasons, any databases, systems or components of the present invention may consist of any combination of databases or components at a single location or at multiple locations, wherein each database or system includes any of various suitable security features, such as firewalls, access codes, encryption, de-encryption, compression, decompression, and/or the like. Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Communication between the front end and back end is accomplished through any suitable communications network 105 for exchanging data or transacting business such as, a telephone network, intranet, Internet, extranet, WAN, LAN, satellite communications, point of interaction device, online communications, off-line communications, wireless communications, and the like.

In one particular application, the system is implemented as an Internet-based application having a front end, a back end, a web browser and web pages. The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

As previously stated, the present invention has a particular application to the travel agency industry. In general, a computer reservation system (CRS) 118 or global distribution system (GDS) (e.g., at the travel agency) captures the travel and charge data in a travel reservation. The CRS issues the travel ticket and forwards travel records 116 to a suitable storage or accounting system. In a similar manner, the CRS notifies the charge card vendor 120 that a travel purchase is made on the traveler's credit card. The CRS, or travel agency, submits the weekly report of tickets issued and dollars charged to ARC 122.

The client's card vendor 120 issues a periodic card statement to the client which includes all of the charges incurred on the client's charge account during the billing period. The present system is configured to work in conjunction with the client's charge account statement and provide an identification or accounting of each item on the statement (as it relates to the travel data). In this sense, the client's travel and card transactions are loaded into an accounting database of system 110. The system includes receipt of travel-related data (suitably stored in a travel database by the Company's travel or merchant vendor) from a stored travel record 116 and receipt of charge-related data (suitably stored in the charge card vendor's expense database) from a charge card vendor 120. In some instances, the travel and card vendors' databases may be networked to the accounting database of system 110, such as when the travel vendor and the card vendor are within the same corporate entity and stored on a back office accounting or billing system (e.g., American Express® Card Services and American Express® Travel Related Services); however, under most circumstances, data from the travel and card databases is remotely received, such as via a communications channel in an electronic format.

The present system and method includes various functions to reconcile the client's account to the account balance. Each function may be a logic routine within a suitable computer program stored in the accounting database of system 110 or in a computer program stored on the client workstation 102. It should be appreciated that the following brief description of the system and methods of the present invention are provided merely as representative of exemplary routines and therefore, all or some of the following functions and their corresponding block representations may be present, combined or modified as needed in a particular application.

With continued reference to FIG. 1b, the present invention builds on the traditional techniques of matching travel records with charge records. The system considers each transaction on the client's card statement and searches the database for a corresponding travel transaction. If the matching ticket number is found in the travel data, the system verifies that the remaining basic matching criteria are met and the match is confirmed. An optional second verification may also be performed to confirm the presence of any additional client-defined accounting data elements as required by the client. Transactions that meet all the criteria are ready to be processed for payment and moved to an "Approved Items" list 111. Used herein, "list" may include any suitable means for processing, collecting, sorting, storing, retrieving, and the like, a group of processed data.

Transactions that fail any of the basic matching criteria during auto-reconciliation (with the exception of transactions that are washed out, as described in detail below) are moved to an "Unresolved Transactions" list 115. It should be noted that "moved" may refer to an electronic movement of data from one list or data table to another, or alternatively, may refer to maintaining or establishing a data link. On the Unresolved Transactions list, each item on the list is tracked through to correction. The system includes, in an exemplary embodiment, a research tool to facilitate the research and correction of pending items. The research tool displays all the details of the card transaction (from the database) and allows the user to specify criteria by which to search for a matching transaction (also in the database). When a matching (or closely related) transaction is located, the tool facilitates the correction of the card transaction and when complete, the corrected transaction is moved to the "Ready for Approval" list 113.

The Ready for Approval list 113 may be restricted to users with approval authority. A before-and-after picture of each transaction may be displayed to the user so that any edits made to the transactions may be reviewed. If the transaction is approved, the system moves the item from the Ready for Approval list 113 to the Approved Items list 111. Transactions that are not approved are moved back to the Unresolved Transactions list 115.

A Billed Transaction Report 117 is created of all charges that are ready (approved) to process for payment and includes all the transactions on the Approved Items list 111. A Summary Reconciliation Report 121 automatically reconciles account activity to the card account balance. The system reads the beginning balance amount from the card statement, adds in the current month's activity (debits less credits per the monthly billing statement), subtracts payments received, and subtracts payments expected (i.e., totals from pending Billed Transaction Reports). The difference is the amount of the unresolved transactions. To verify the reconciliation, the total of the transactions in the Unresolved Transactions list 115 is retrieved and displayed on Report 121. When the two amounts (the difference from the card statement and the Unresolved Transaction list) match, the account is in balance.

Additionally, if during auto-reconciliation the system identifies an offsetting debit and credit for the same travel ticket, or if the system finds a credit which offsets a debit pending on the Unresolved Transactions list, the system "washes out" the transactions. Offsetting debits and credits are moved to a "Washed Out" list 119. This feature reduces the number of unmatched transactions that require research by identifying unmatched credits that offset unmatched debits, e.g., for tickets which have been voided. In addition, the number of transactions to process for payment is reduced by eliminating unnecessary entries on the Billed Transaction Report.

The system may further include a Refund module 123. As tickets are turned in to the travel office for refund, the ticket information is entered into the module. The system may print out a receipt for the traveler and then add the ticket to a refund log. The refund log can be used to facilitate the refund process. For example, the refund log may print out transmittal logs for tickets to be forwarded to the Company's travel vendor for refund processing, or transmittal letters for tickets to be forwarded to the airline for refund processing. When the credits for the refunds appear on subsequent billing statements, the system updates the refund log, e.g., with the date and amount of the credit received, as well as the status of each credit (included on a Billed Transaction Report; on the Washed Out list; or on the Unresolved Transaction list).

Moreover, the system may include the ability to reconcile transaction fees charged by, for example, the travel vendor. Often times, commissions paid by the airlines to the travel vendors are rebated back to the client. The system calculates the amount of the rebate due to the client for each ticket issued and subtracts the amount from the client's Billed Transaction Report. This amount can then be paid by the travel vendor directly to the card company. In this manner, clients are not required to reconcile and process rebate payments separately.

As briefly discussed, the system and methods of the present invention reconcile to an account balance by tracking all open items on the account through the reconciliation process until they are paid by the client or "washed-out" (clear themselves). Moreover, the system facilitates the research and correction of unmatched transactions, tracks pending refunds, and reconciles transaction fees. In addition to the above briefly described features, there are various other features and options of the present invention which will become apparent from the following description and referenced flowcharts.

Account Reconciliation Exemplary Flowchart

The various operations of the present invention will now be discussed to further facilitate understanding of the invention and its best mode. It should be appreciated that the particular implementations shown and described are illustrative of embodiments of the invention (including its best mode) and are not intended to limit the scope of the present invention in any way.

Figure 2:
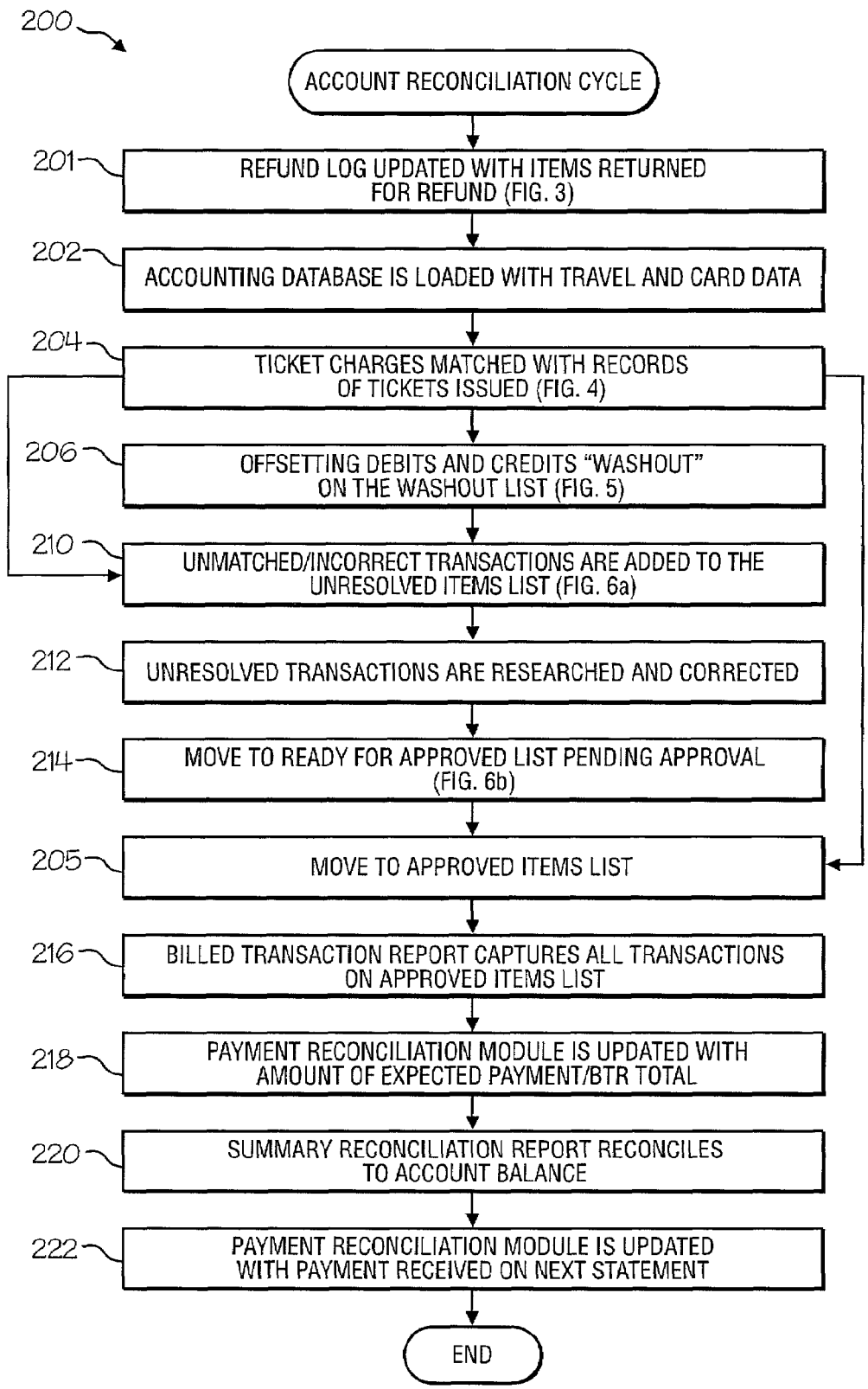
FIG. 2 is an exemplary flowchart describing one embodiment for account reconciliation in accordance with the present invention.

FIG. 2 is a flowchart 200 describing an exemplary embodiment for account reconciliation for a given cycle (e.g., monthly) in accordance with the present invention. For ease of understanding, flowchart 200 (as well as any conjoining flowchart) is conveniently illustrated and described in connection with a particular industry, i.e., the travel agency industry. Therefore, reference is made herein to travel-related topics, modules, routines, and the like.

As is common in the travel industry, travel plans are often changed and/or canceled altogether. Travel tickets may get voided, returned or be otherwise unused. The present invention includes management of all items on an account, including voided or unused items. In this manner, a refund log, suitably stored on a Refund module of the system, is systematically updated with information pertaining to tickets returned for refund (step 201). The Refund module is described in more detail below in FIG. 3.

As previously mentioned, the system includes an accounting database configured to, among other functions, receive and store travel-related data and card-related data (i.e., charges) for each specific account (step 202). The travel and card data may be received from various databases within the system or, in many cases, from outside the system.

The reconciliation process generally begins with an auto-reconciliation process whereby for each charge transaction listed on the account, the system searches the travel-related data for a corresponding match (step 204). In one embodiment of the present invention, the matching process occurs over several individual steps which will described in more detail below in FIG. 4. Matched items (as defined by the matching criteria) are automatically moved to an Approved Items list (step 205). The Approved Items list holds (stores) all approved transactions until the system generates the accounting statements and/or reports. Because the accounting database pulls together many different functions and modules, and has access to a variety of data tables within itself, it is often the case that during auto-reconciliation, offsetting debits and credits that sum to zero are matched. These "washed out" transactions (i.e., add to zero) may not be forwarded to the client on a statement or report since there is no payment or credit due. Rather, the washed out transactions may be are moved to a Washed Out List (step 206). The Washed Out list is described in more detail below in FIG. 5.

Travel and card transactions that do not meet the established matching criteria and do not "wash out" are moved to the Unresolved Transactions list (step ad 210). In this manner, unmatched or unresolved items are tracked and researched until they are reconciled, i.e., identified and corrected (step 212). Many times, a minor data entry error or misspelling triggers an unresolved item, e.g., incorrect ticket number on card statement. In one embodiment, authorized users may edit the erred data to correct unmatched items. The corrected item, i.e., travel entry, can now be matched with a corresponding charge entry. In this particular embodiment, the corrected item is moved, in an exemplary embodiment, to a Ready for Approval list and approved by the same or another authorized user (step 214). The particular features of the Unresolved Transactions list and Ready for Approval list are described in more detail below in FIGS. 6a and 6b.

In general, the remaining steps of the system include reports generation and will be described in greater detail below in FIG. 7. The system creates a Billed Transaction Report ("BTR") for the amount of all the charges that are ready to process for payment from the Approved Items list (step 216). The Payment Reconciliation Module is updated with the total of the BTR or, in other words, the amount of payment expected from the client (step 218). The system suitably generates a Summary Reconciliation Report that expresses the reconciliation to the account balance (step 220). The account balance, as previously explained, includes, for example, all the activity on the account such as the prior billing cycle's outstanding balance, current cycle's activity, payments received, payments expected (BTR totals), and the total of the transactions in the Unresolved Transactions list. Lastly, as payments are received from the client, the Payment Reconciliation Module is updated and expected payments (BTR totals) are reconciled with the amounts received (step 222).

Refund Module Exemplary Flowchart

Figure 3:
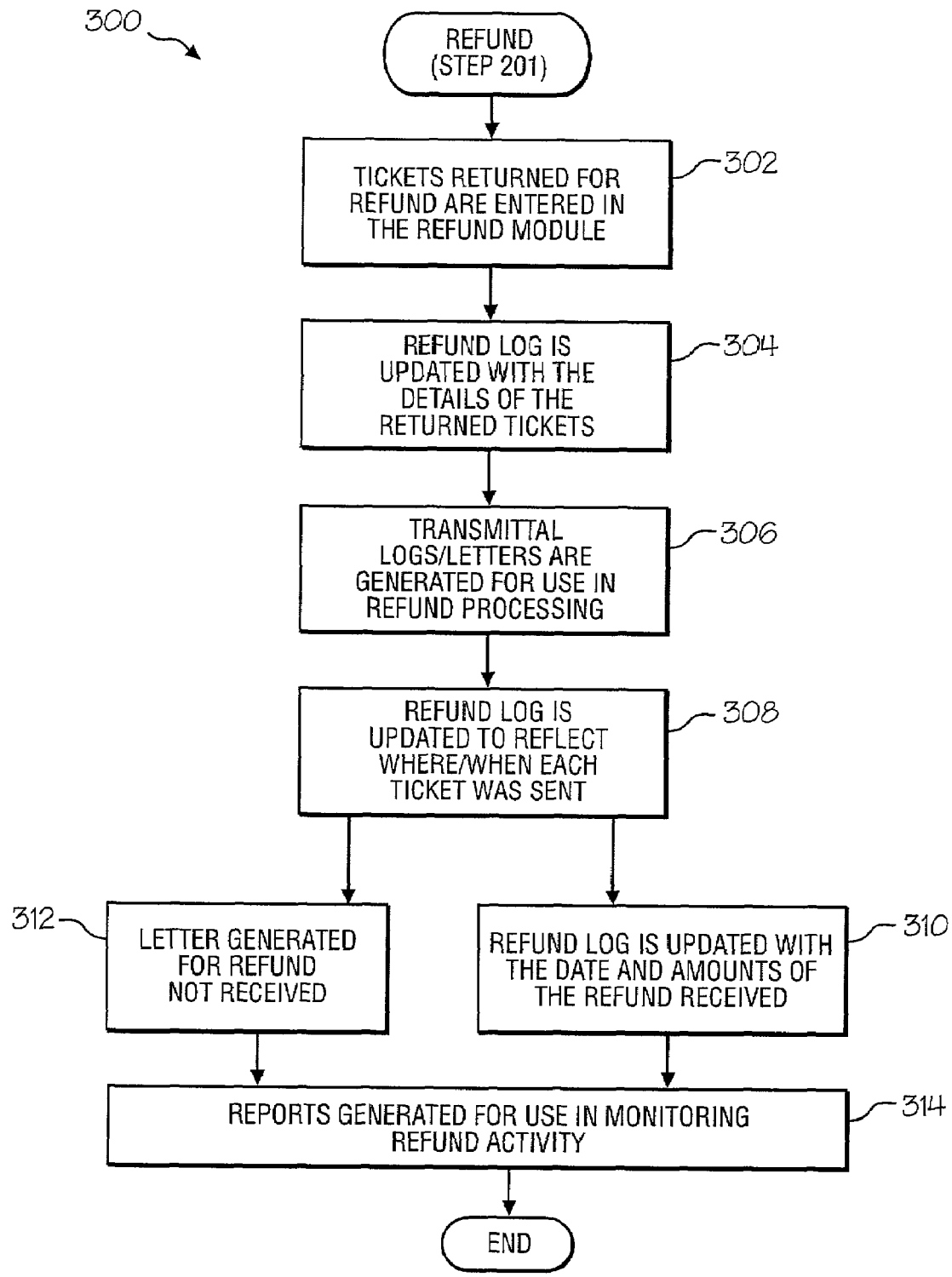
FIG. 3 is an exemplary flowchart describing one embodiment of the present invention for refund management.

FIG. 3 is a flowchart 300 describing one embodiment for implementing an exemplary Refund Module in accordance with the present invention (i.e., step 201). FIG. 3 and the accompanying description further demonstrate, for example, that the system can operate as a complete refund management system. As travelers return unused coupons and/or tickets for refund, data specific to each item returned for refund, such as travel tickets, may be manually entered or electronically downloaded to the Refund Module (step 302). In one specific embodiment, the system generates a receipt for the client/traveler with complete details of the ticket which has been returned. The system updates the Refund Log with the details of each item and maintains a list of the returned tickets (step 304). In this manner, the Log may be viewed at any time to check the status of a pending returned item. This technique also helps to ensure that returned items are not forgotten after a long passage of time. In fact, until the offsetting credit is received or an authorized user approves the removal of the item, the pending returned item, in an exemplary embodiment, remains on the Log.

In a specific embodiment, the system generates a transmittal log and/or letter for use in forwarding returned items for refund processing (step 306). For example, a transmittal log may be periodically generated indicating newly received returned items, or a changed status of a pending item, etc. In yet another embodiment, the system may generate an appropriate letter indicating the tickets that are to be returned to a particular airline, or the like, for refund processing. If a ticket is returned to an airline, or a letter is mailed out, the Refund Log is automatically updated to reflect, for example, where, when and to whom tickets and/or letters were sent (step 308).

Refunds for the returned items may be received from the airline directly and appear as credits in the client's card data. In some instances, auto-reconciliation will identify the information received relating to the credit (e.g., ticket number) and automatically match the offsetting credit with the pending returned item. Once the match is made (regardless of the manner), the Refund Log is automatically updated with the particular information of the credit, such as the date and the amount of the credit received, as well as the status of each credit (i.e., credit washed out against a pending debit on the Unresolved Transactions list; credit moved to the Unresolved Transactions list; credit included on a Billed Transaction Report) (step 310). In one specific embodiment, the user may specify an age for pending refunds (i.e., 30 days) and the system automatically causes the generation of a follow-up letter(s) or reminder(s) to the airline(s) to check on the status of any refunds not yet received (step 312). Lastly, the Refund Module may include a reporting function which generates activity reports for monitoring and managing the refund process (step 314).

Matching Exemplary Flowchart

Figure 4:
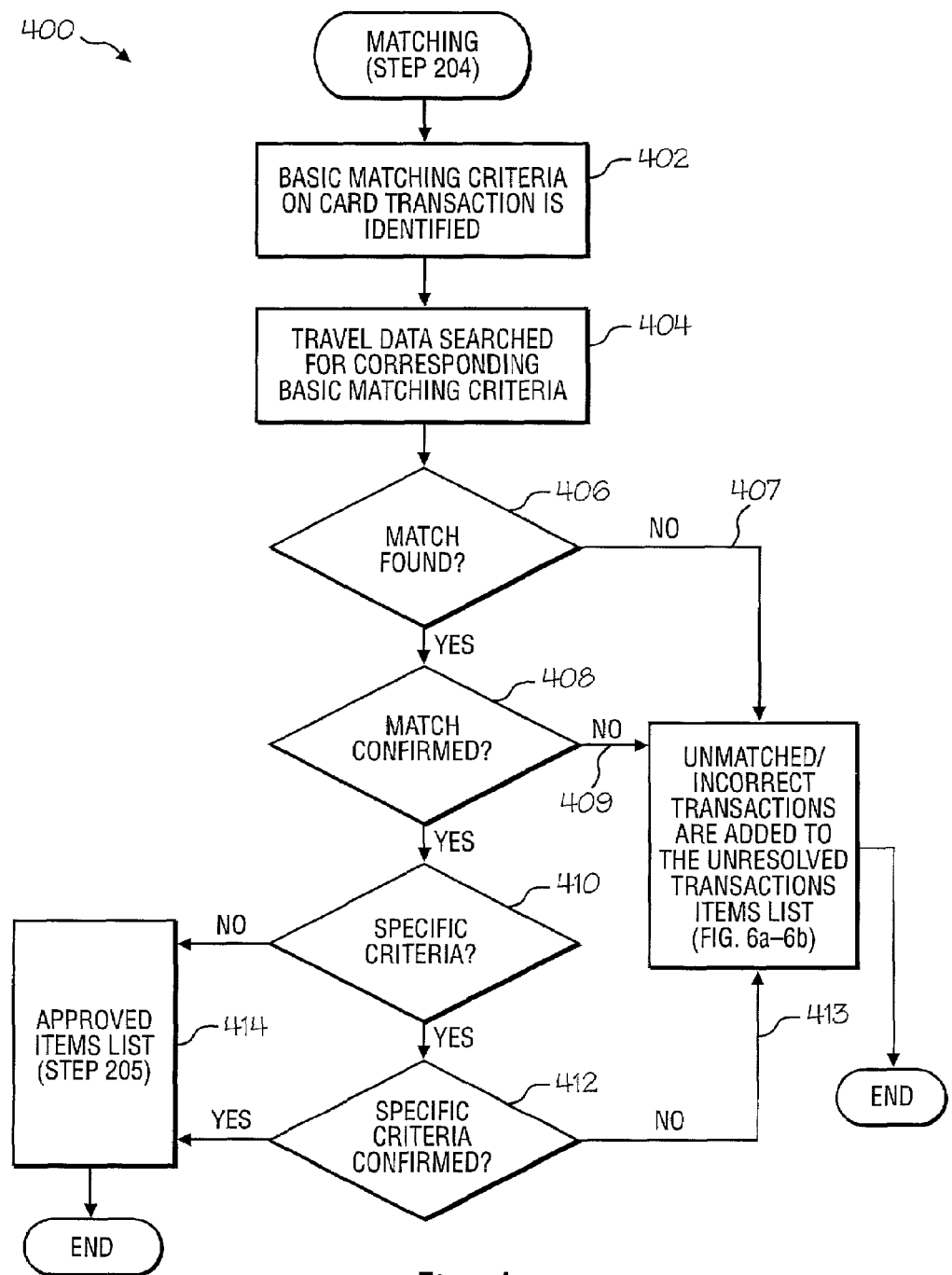
FIG. 4 is an exemplary flowchart describing one embodiment of the present invention for matching transactions.

FIG. 4 is a flowchart 400 describing one embodiment for implementing an exemplary matching process in accordance with the present invention (i.e., step 204). It should be noted that used herein, "matching criteria" includes one or more factors which determine whether a match is present. In this manner, the system does not make assumptions on items that are "nearly matched", but rather, during auto-reconciliation the system considers whether all the factors are met and if so, a match is made. The matching criteria may include, for example, "basic" matching criteria that determines a high level match, and "specific" data capture criteria that further determines if the matched items are ripe for payment. For example, the basic matching criteria may be non-negotiable by the client, while specific matching criteria may include client factors that are specific to a particular client, and defined by the client. In this manner, the client is able to set parameters for the user that define when the client perceives the item to be ripe for payment. This additional criteria helps to reduce the number of charge disputes and client complaints. Moreover, the system reliably moves items to the Approved items list only after all the matching and data capture criteria (if any) are met and thus, providing enhanced confidence for the user and the client.

In one specific embodiment, the matching criteria may include a matching tolerance. For example, because the system is, in an exemplary embodiment, configured to provide accurate and absolute matches, often times a minor error such as a $0.01 difference between the travel and charge transactions will prevent a match. As such, the system includes a dollar matching tolerance that will allow the system to override the strict matching criteria and make a match. In the above example, a client may approve specific matching criteria of $0.99 dollar tolerance. Alternatively, the user, e.g., travel agency, may include a dollar tolerance to automatically adjust and write off small differences to facilitate a match and payment processing. It should be noted that even if a matching tolerance is included, the system, in an exemplary embodiment, adheres to the predetermined matching criteria. In the present example, the matching criteria allows the system to make a match between transactions that do not have an exact dollar match.

In one specific embodiment, the system considers each charge or card transaction and identifies one or more high level basic matching criteria to find a match (step 402). A search of travel-related data is performed to find a matching transaction (step 404) by identifying a match of the first basic matching criteria. When a record with the matching criteria is found in the travel data (step 406), the match is then confirmed (step 408). Confirmation further ensures that the match is valid by verifying that the remaining basic matching criteria are met. If no match is found (step 407) or the match cannot be confirmed (step 409), then the transaction is moved to the Unresolved Transactions list.

In one embodiment, the basic matching criteria includes four factors, i.e., passenger name, ticket number, card number, and dollar amount. The system searches for a matching ticket number and then verifies that the other three criteria match. If, for example, the passenger name, ticket number, and card number match, but the dollar amount is different, then the system will not match the card and travel transactions. Even though the ticket was used by the listed passenger, the passenger may have refunded part or all of the travel ticket at the airport and thus, the dollar amounts do not match.

Once the match is initially confirmed (all of the basic matching criteria is met) the system continues the auto-reconciliation process by verifying the presence of the specific data criteria, if any (step 410). The specific data criteria is the client defined data. The system allows the individual client to develop parameters for the user to follow once the basic matching criteria have been met. The client's parameters or factors, may be more or less strict than the basic criteria, however, it is preferable that the basic criteria not be adjusted or waived. Examples of client-specific data may include employee I.D., project code, department code, or travel authorization number; however, it should be appreciated that this criteria may be defined by the client and thus varies from application to application. In some instances or with some clients, there may not be any specific client defined data. In these cases, the transaction is automatically moved to the Approved Items list for payment processing (step 414).

If the system confirms the presence of all the specific client defined data (step 412) and the basic matching criteria is, in an exemplary embodiment, already verified, then the transactions are ready to be processed for payment and are automatically moved to the Approved Items list (step 414). Transactions that fail any of the matching criteria are moved to the Unresolved Transactions list so that they can be researched and corrected (step 413).

Washout Exemplary Flowchart

Figure 5:
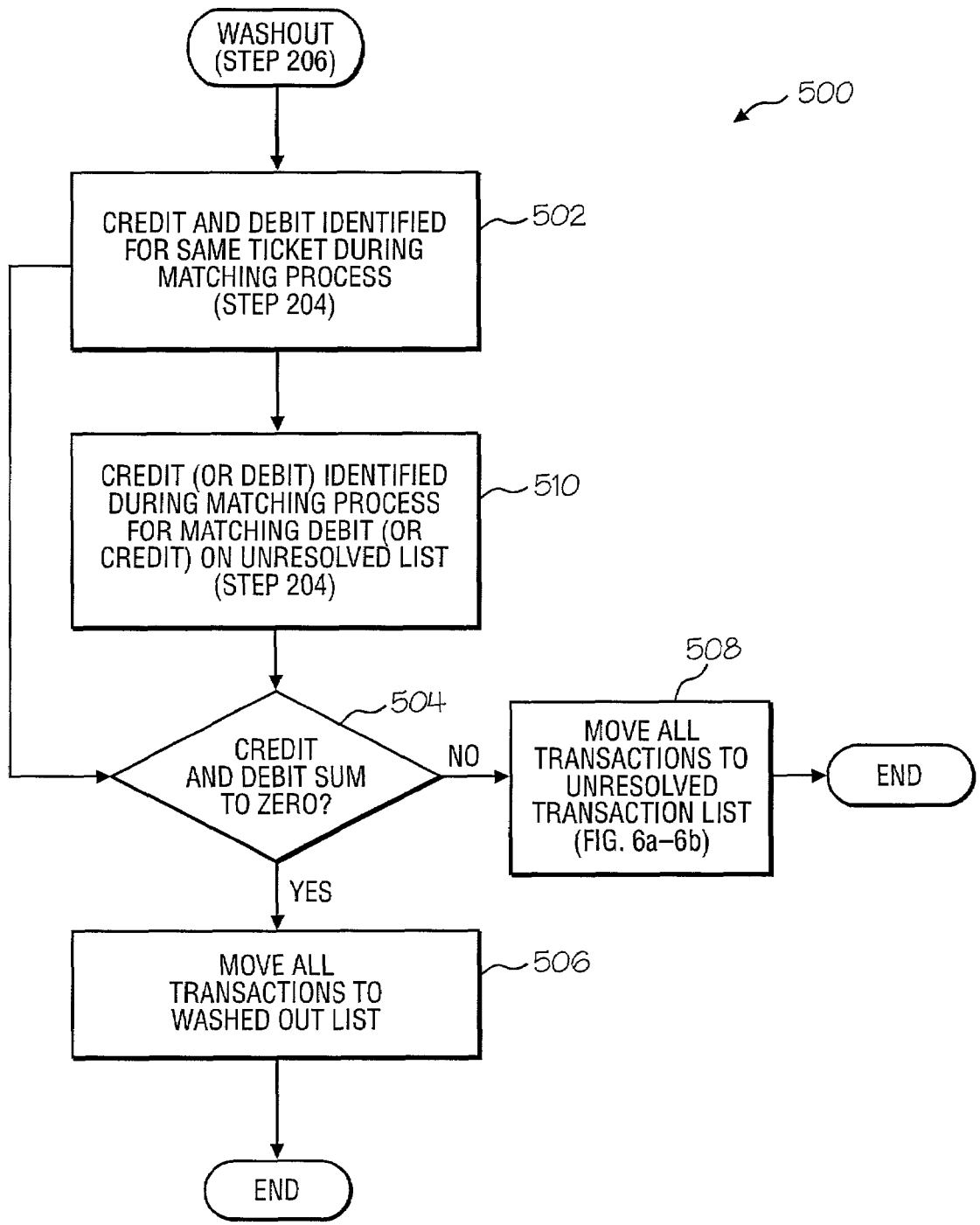
FIG. 5 is an exemplary flowchart describing one embodiment of the present invention for washing out transactions.

FIG. 5 is a flowchart 500 describing one embodiment for implementing an exemplary washout process in accordance with the present invention (i.e., step 206). Used herein, "wash out" includes a process during auto-reconciliation that results in offsetting debits and credits being automatically matched. In other words, if the system identifies a debit and a credit for the same travel transaction that sum to zero, the system recognizes that these two items are a match and may move them to the Washed Out list. It is not necessary to further process or reconcile either of the washed out card or travel transactions because, although there may have been a debit charge for the travel at one time, an offsetting credit has been received to clear the transaction.

As previously mentioned, both the card and travel data flows into the accounting database and occasionally a credit and a debit for the same travel transaction appear during the same processing cycle. During auto-reconciliation, the system searches the card transactions which have been loaded into the accounting database (but not yet included on a Billed Transaction Report) for transactions where a debit and a credit have been received for the same ticket number (step 502). In one embodiment, to qualify as a washout, the credit and debit completely offset (the summation is zero); therefore, the system queries whether this has occurred (step 504). If the credit and debit do not sum to zero, then typically no match is made and the credit and debit transactions are moved to the Unresolved Transactions list for research and correction (step 508).

Once the system verifies that the credit and debit completely offset each other for a single ticket number (or other identifying factor), the system may automatically move the credit and the debit transactions to the Washed Out list (step 506). It should be noted, that in one particular embodiment, the client may choose not to use the Washed Out feature and thus in this situation the transactions would not move to a Washed Out list, but would move to the Approved Items list or the Unresolved Transactions list. Similar to the matching processes within the system, the wash out process does not make assumptions or "near matches". The Washed Out List contains, in one embodiment, transactions that no longer require processing so the placement or storage of transactions here must be accurate.

Another example of the wash out process occurs when the credit and debit do not appear within the same cycle. For example, when the accounting database receives the charge-related data, there may be a charge corresponding to a voided ticket. The auto-reconciliation process is unable to match the charge with a corresponding travel transaction because the ticket was voided and therefore no record of the travel transaction was ever loaded into the accounting database. Hence, the charge entry is an unmatched item and moved to the Unresolved Transaction list. At a later time, the offsetting credit for the voided ticket charge may be loaded into the accounting database and during subsequent auto-reconciliation processes, the system recognizes that the credit corresponds to an item on the Unresolved Items list (step 510). As in the previous description, the system queries whether the credit and debit sum to zero (step 504) and if so, may move the transactions to the Washed Out list (step 506). If the sum is not zero, then the credit transaction is also moved to the Unresolved Transactions list (step 508).

Unresolved Transactions Exemplary Flowchart

Figure 6A:
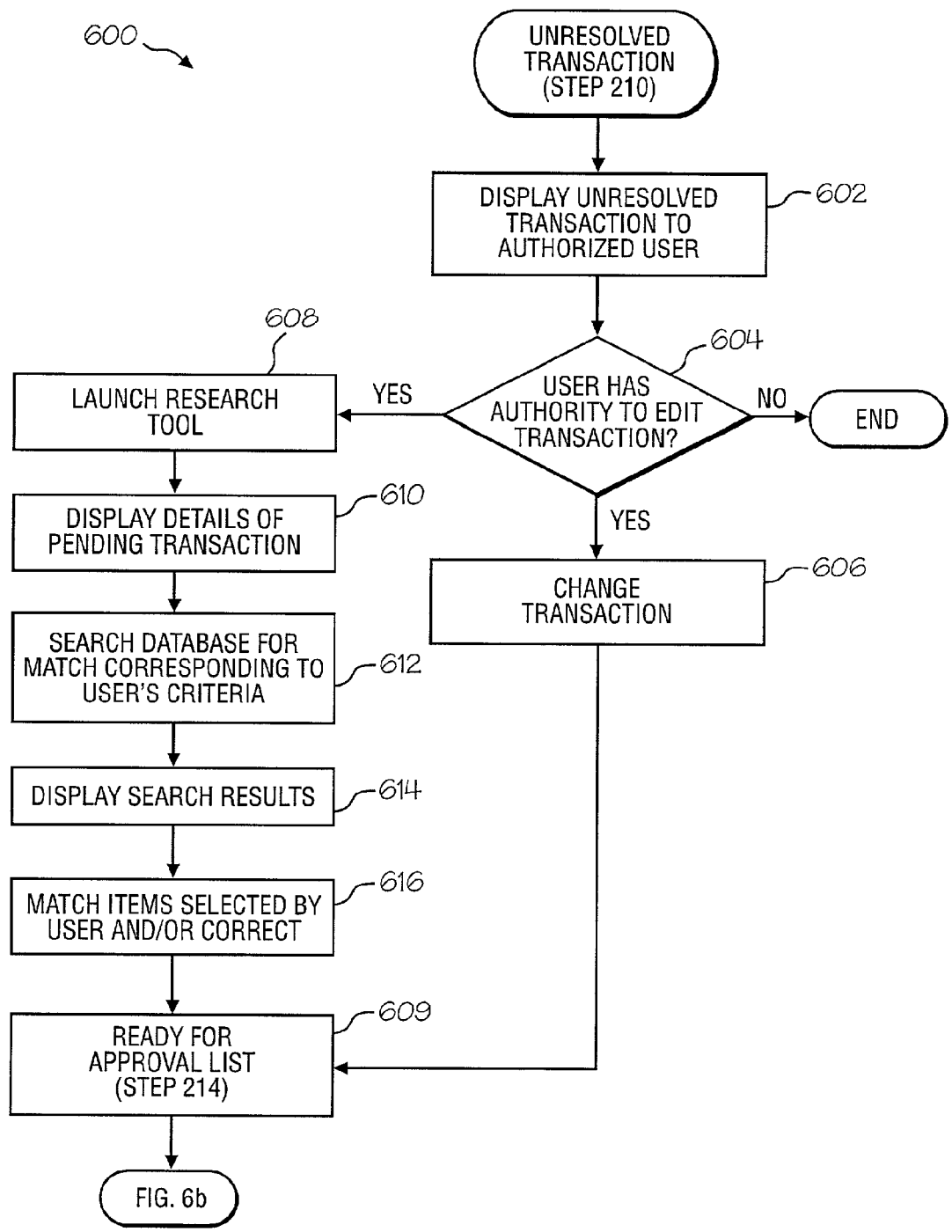
FIGS. 6a and 6b are exemplary flowcharts each describing one embodiment of the present invention for unresolved transaction management.
Figure 6B:
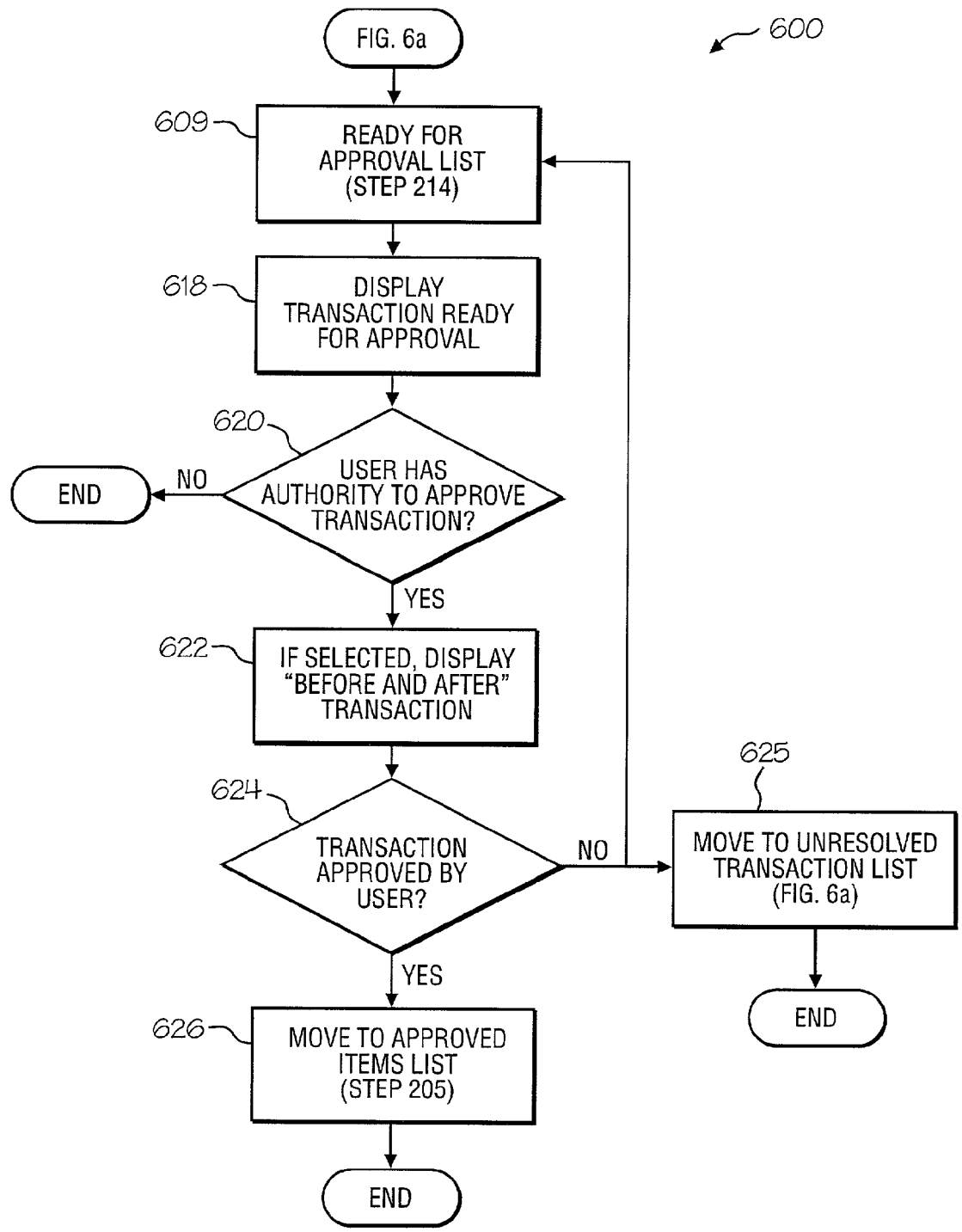

FIGS. 6a and 6b are a flowchart 600 describing one embodiment for implementing an exemplary unresolved transaction process in accordance with the present invention (i.e., steps 210-214). The Unresolved Transactions list further demonstrates that the system is a management tool that reconciles to the entire account balance. In this sense, unmatched or otherwise unresolved transactions are moved to the Unresolved Transactions list to be researched and corrected.

Items that do not wash out and fail to meet one or more of the auto reconciliation criteria are moved to the Unresolved Transactions list. Each item on the list is monitored, researched and corrected by authorized users of the system. As previously described, the system is, in an exemplary embodiment, not configured to process "near matches" or make assumptions on the quality of the data. Rather, the system, in an exemplary embodiment, identifies absolute matches and the user and client have little or no room to question the accuracy of the transactions which have been automatically approved.

To maintain the integrity of the system, in an exemplary embodiment, the system is incapable of approving card and travel transactions if there is even a minor data entry error. For example, a passenger's name misspelled on a charge may preclude the system from approving the transaction which does not match the name on the related travel record. In one specific embodiment, the system permits authorized users to view the unresolved transactions (step 602). Authorized users (step 604) may be permitted to make edits to the unresolved transaction (step 606) and forward the edited transaction to the Ready for Approval list (step 609).

In another embodiment, the user accesses a research tool created to facilitate the correction of pending unresolved items (step 608). The tool causes the display of all the details of the pending item, e.g., a card transaction, and allows the user to specify criteria to search for a matching transaction, e.g., a travel transaction (step 610). The tool may offer suggested search criteria or default criteria. In this specific embodiment, the user may override the strict matching criteria set by the system and thus the system can search for exact or near-exact corresponding matching transactions (step 612) (i.e., near-matches). The system tool displays the located transactions and allows the user to choose the correct match (step 614). When the match and/or correction is complete (step 616), the system moves the items to the Ready for Approval list (step 609).

In yet another embodiment, the user is permitted to research items which partially match. For example, assume that a ticket is issued and a corresponding charge is made for $420.00. At the airport, the passenger is informed that his next flight has been cancelled, e.g., due to bad weather, and the airline issues a partial credit in the amount of $120.00. The traveler returns and informs Company A that he did not travel and thus Company A refuses to pay the original ticket charge in the amount of $420.00. The charge of $420.00 is moved to the Unresolved Items list. When the credit for $120.00 is received, the system will not match the credit with the debit of $420.00 because the dollar amounts do not match. The credit of $120.00 will also be moved to the Unresolved Transactions list. An authorized user viewing the Unresolved Transactions list can easily recognize there are multiple card transactions (credit and debit) for the same ticket number and deduce that a partial credit was received. The user is allowed to apply the credit against the debit and match the remaining balance with the travel transaction. Again, the transaction is moved to the Ready for Approval list pending approval and payment processing (step 609). This process ensures that unmatched transactions are not forgotten or partial matches are not improperly captured on a BTR, but rather, the client is properly billed for the correct amount (e.g., in the above example, the client would be billed for $300.00 (the original debit less the received credit)).

The Ready for Approval list provides a security measure to further maintain the integrity of the processes. In one specific embodiment, several tiers of approval authority may be installed to permit varied levels of access. At one level, an authorized user may be granted access to edit ticket numbers, passenger's names and dollar amounts, but will be restricted access to approve the transaction and move it to the Approved Items list. Any change by a user may cause concern for creating additional errors. In this sense, a final approval made by a user with a higher level of authority may be preferred.

On the Ready for Approval list, a transaction selected for approval is displayed to an authorized user (step 618). The system may query the authority level of the user and restrict access if the authority level required is not met (step 620). In one embodiment, the system may cause the display of a "before-and-after" picture of the corrected transaction for the authorized approval user (step 622). In other words, the viewer may see the pre-edit or pre-matched transactions and the post-edit or post-matched transactions. The approver can view the correction and verify the accuracy of the change, if any. In some cases, there may not have been an edit to the transactions, but a billing amount that is different than the travel invoice amount has been accepted by the authorized user. If the approver agrees with the match or change (step 624), the transaction is moved to the Approved Items list (step 626). If, however, the approver does not approve the transaction, the approver can send the transaction back to the Unresolved Transactions list for further research and correction (step 625).

Reports Generation Exemplary Flowchart

Figure 7:
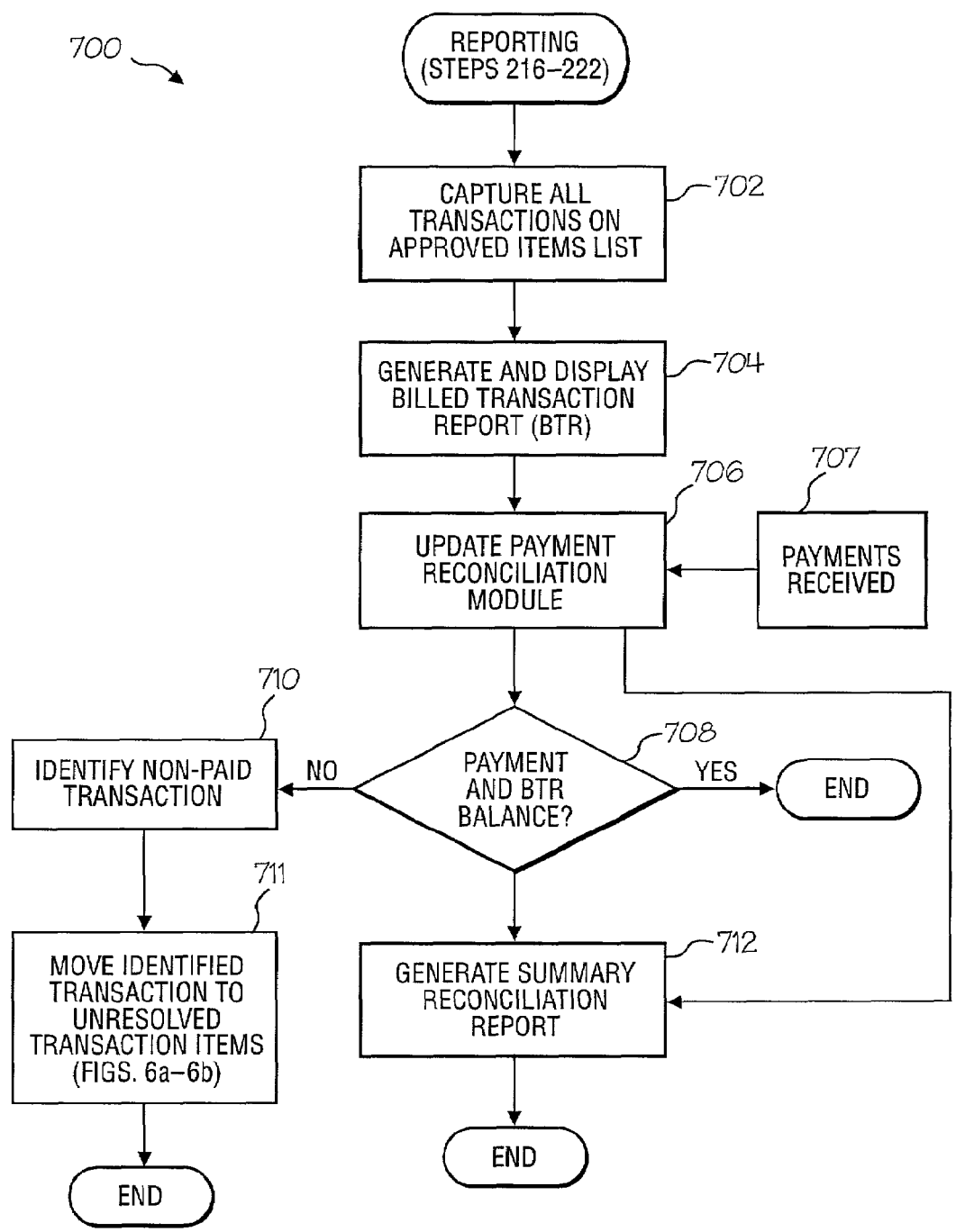
FIG. 7 is an exemplary flowchart describing one embodiment of the present invention for report generation.

FIG. 7 is a flowchart 700 describing one embodiment for implementing an exemplary reports generation process in accordance with the present invention (i.e., steps 216-222). It should be appreciated that various items may be summarized and generated into a desired report. The description of reports provided herein are provided as examples and not intended to be limiting in any manner.

In one embodiment, the Approved Items list holds all the transactions that have met the matching criteria during auto-reconciliation, and all the transactions that have been finally approved by an authorized user (i.e., FIGS. 6*a*-6*b*). From the Approved Items list, the system automatically captures all of the transactions that are ready to be processed for payment (step 702) and generates a Billed Transaction Report ("BTR") (step 704). No further approval is typically required because each of the transactions have either met the predetermined matching criteria or have been finally approved. It should be realized that the Billed Transaction Report is generally not a billing statement, but rather, is used as a reconciliation tool for the client to identify each of the charges on its card statement (i.e., received from its credit card company). In other words, the client typically receives a bill from its credit card company for all charged transactions during a given billing cycle. The Billed Transaction Report, and present invention in general, are designed to complement the client's current billing and payment methods by providing an identification of all charges on the client's billing statement (i.e., reconciling to the account balance) that the client has specified are ripe for payment.

In one specific embodiment, the system prints a copy of the Billed Transaction Report during a given cycle for the client's review. Alternatively, the Billed Transaction Report may be provided to the client in an electronic format, e.g., over a suitable communications network. The client side may include suitable software to enable the Billed Transaction Report to be imported into the client's own accounting system.

In one specific embodiment, a Payment Reconciliation Module for the client is updated to reflect the total amount of the current Billed Transaction Report (step 706). The Payment Reconciliation Module is an accounting for the Billed Transaction Report. For example, the Payment Reconciliation Module may include an entry for the total of the Billed Transaction Report and an entry for the "open" amount remaining. As payments are received on the account (step 707), the open amount remaining is reduced by the amount of the payment. Ideally, the client will submit payment that equals the total of the Billed Transaction Report, however, this may not always be the case. For instance, the client may have disputed a charge on the statement, and even on the Billed Transaction Report, and thus not submitted payment for that charge. The Payment Reconciliation Module tracks the amount of payments received from the client and identifies any remaining balance (open amounts) on the Billed Transaction Report (step 708). The user can then match the remaining balance with a particular transaction on the Billed Transaction Report and determine which item was unpaid by the client (step 710). This transaction can then be removed from the Billed Transactions Report list and placed in the Unresolved Transactions list for further research on why the transaction was not paid (step 711).

Figure 8:
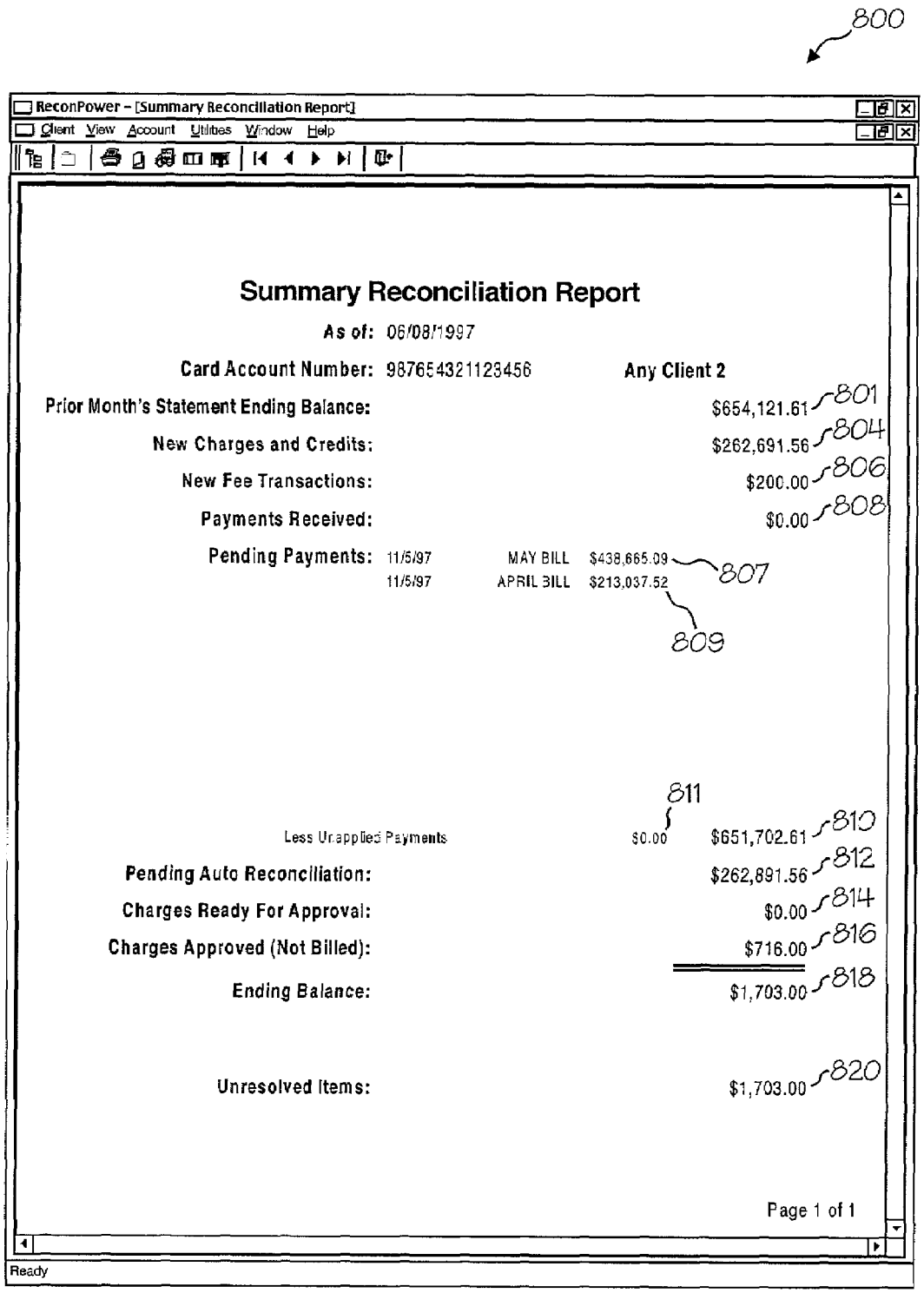
FIG. 8 is an exemplary screen shot of a Summary Reconciliation Report available to a user in accordance with the system and methods of the present invention.

In another specific embodiment, a Summary Reconciliation Report for the client's account automatically reconciles the activity on the client's account to the account balance (step 712). This operation is described in more detail below. FIG. 8 illustrates an example of the Summary Reconciliation Report screen 800 a user (client side) will see. The screen 800 shows the user that the account (expressed in dollar amounts) is reconciled to the account balance. It should be appreciated that various system operations, such as retrieving from a suitable storage, processing and formatting, may not be fully detailed for each of the following entries on the Report; however, it should be recognized by those of skill in the art, that these various operations, as well as others, may be necessary to carryout the desired display. The system begins with and displays the prior billing cycle's ending balance from the client's card statement 801. The current cycle's activity (new charges and credits) 804 is then displayed and added to the ending balance, along with any new fees 806 the client is to be responsible for. The dollar amounts of payments, if any, received on the account 808 are subtracted from the balance.

Expected, or pending payments 810 are displayed on the screen 800. The expected payments include total amounts from the BTR(s) and more specifically, from the Payment Reconciliation Module. For example, as previously mentioned, the Payment Reconciliation Module tracks the BTRs and any payments received on the account are applied against the outstanding BTR balance. As illustrated on screen 800, there are two outstanding BTRs remaining on the exemplary account: MAY BILL 807 and APRIL BILL 809. Any payments applied to the BTRs 811 is displayed and the remaining BTR total 810 is the expected payment. Because the BTR includes only transactions on the Approved Items list, the system considers the BTR total to be items ripe for payment and thus reconciled. In this sense, the BTR total 810 is subtracted from the balance (at this point the balance equals 802+804+806−808).

The total dollar amount of all the pending transactions in the accounting database 812 is then displayed. These transactions were loaded into the database from the client's card statement, but have not undergone auto-reconciliation. Therefore, this dollar amount is accounted for (albeit still pending) and subtracted from the remaining statement balance. The totals of the Ready for Approval list 814 and Approved Items list 816 are then subtracted from the remaining balance. The ending balance 818 after all additions and subtractions is the final remaining balance.

To verify the account is reconciled to the client's account balance, the total of the transactions pending on the Unresolved Transactions list 820 is displayed. When the ending balance 818 and Unresolved Items 820 amounts match, the account is in balance.

The present invention has been described above with reference to exemplary embodiments. However, those skilled in the art having read this disclosure will recognize that changes and modifications may be made to the embodiments without departing from the scope of the present invention. For example, while conveniently described in connection with the travel industry, and in particular the travel agency industry, the present invention is not so limited. Rather, a variety of industries desiring an automated, efficient and cost-saving approach to account reconciliation may benefit from the system and methods of the present invention as expressed in the following claims.

The invention claimed is:

1. A computer-implemented method of providing account reconciliation for an account comprising:
    matching, by a processor, a first charge in a financial database to a first amount of a travel record in a travel database, wherein a department code is associated with said travel record, and wherein said travel record in said travel database includes said first amount and first data;
    assigning, by said processor, said first charge in said financial database to said department code by writing said department code to a field corresponding to said first charge in said financial database;
    associating, by said processor, a second charge in said financial database with said first data of said travel record in said travel database, wherein said travel record in said travel database does not include said second charge in said financial database, and wherein said second charge in said financial database is associated with a change to said travel record in said travel database; and,
    assigning, by said processor, said second charge in said financial database to said department code associated with said travel record in said travel database.

2. The method of claim 1 wherein the step of associating a second charge with said first data of said travel record comprises the steps of:
    selecting said second charge from a pending list;
    identifying a match criteria on said second charge; and
    searching a plurality of travel records based on said match criteria.

3. The method of claim 1, wherein said travel record relates to at least one of: airline, lodging or rental car.

4. The method of claim 1 further comprising the steps of:
    compiling matches and near-matches on an approved items list; and
    generating a report from said compilation.

5. The method of claim 1, further comprising receiving a plurality of travel transactions relating to at least one of: an air carrier ticket, lodging, and car rental from a first database, wherein said first database is a Customer Reservations System (CRS) of a travel agent.

6. The method of claim 5, further comprising receiving, from a second database, a plurality of charge transactions relating to purchases made using a charge account, wherein said second database is at a transaction account management system.

7. The method of claim 6, further comprising storing said plurality of travel transactions and said plurality of charge transactions on a pending list within a database of said computing device.

8. The method of claim 7, further comprising matching said plurality of travel transactions and a plurality of charge transactions based upon first criteria, wherein said first criteria includes at least one of: account number, passenger name, transaction amount, booking fee, and ticket number.

9. The method of claim 8, further comprising determining a client department code based on said match upon identifying said match between a travel transaction and a charge transaction.

10. The method of claim 9, further comprising identifying a near-match among said plurality of travel transactions and said plurality of charge transactions within a predetermined tolerance level based upon secondary criteria.

11. The method of claim 10, further comprising determining said department code based on said near-match between said travel transactions and said charge transactions.

12. The method of claim 1, wherein said first data relates to non-monetary information.

13. An account reconciliation system for reconciling a plurality of merchant records to a card account balance, said system comprising:
    a network interface communicating with a memory;
    said memory communicating with a processor; and
    said processor, when executing a computer program, is configured to:
        match, at said processor, a first charge in a financial database to a first amount of a travel record in a travel database, wherein a department code is associated with said travel record, and wherein said travel record in said travel database includes said first amount and first data;
        assign, by said processor, said first charge in said financial database to said department code by writing said department code to a field corresponding to said first charge in said financial database;
        associate, by said processor, a second charge in said financial database with said first data of said travel record in said travel database, wherein said travel record in said travel database does not include said second charge in said financial database, and wherein said second charge in said financial database is associated with a change to said travel record in said travel database; and,
        assign, by said processor, said second charge in said financial database to said department code associated with said travel record in said travel database.

14. The system of claim 13, further configured to search for a common set of numbers within said travel record and said first data.

15. The system of claim 13, further configured to identify a basic matching criteria.

16. The system of claim 15, further configured to confirm said association by matching all of a plurality of basic matching criteria between said travel record and said first data.

17. The system of claim 16, further configured to confirm said association by matching a set of client-defined criteria.

18. The system of claim 13, further configured to:
    calculate a first list total by tallying together a dollar amount associated with a matched plurality of a first charges to a plurality of first amounts;
    calculate a second list total by tallying together a dollar amount associated with a nearly-matched plurality of a second charges to a plurality of first data;

calculate a third list total by tallying together a dollar amount from each of a plurality of unapproved near-matches;

calculate an ending balance by subtracting said first list total and said third list total from a balance of said account; and compare said ending balance with said second list total.

19. A computer-readable medium having stored thereon a plurality of instructions which, when executed on a processor, perform operations for providing account reconciliation for an account comprising:

matching, by said processor, a first charge in a financial database to a first amount of a travel record in a travel database, wherein a department code is associated with said travel record, and wherein said travel record in said travel database includes said first amount and first data;

assigning, by said processor, said first charge in said financial database to said department code by writing said department code to a field corresponding to said first charge in said financial database;

associating, by said processor, a second charge in said financial database with said first data of said travel record in said travel database, wherein said travel record in said travel database does not include said second charge in said financial database, and wherein said second charge in said financial database is associated with a change to said travel record in said travel database; and, assigning, by said processor, said second charge in said financial database to said department code associated with said travel record in said travel database.

20. The medium of claim 19, wherein said association is determined based on first criteria comprising a basic matching criteria and a second criteria comprising a client-specific criteria.

21. The medium of claim 20 further comprising verifying the presence of all basic matching criteria and all client-specific criteria.

22. The medium of claim 19, wherein said travel record comprises a travel account.

23. The medium of claim 19, wherein said travel record relates to at least one of: air travel, lodging or rental car.

24. The medium of claim 20, wherein said basic matching criteria comprises an individual's name, a ticket number, a card number, and a dollar amount.

25. The medium of claim 19 further comprising compiling a list of two or more transactions that when summed equal zero.

26. The medium of claim 19, further comprising accepting a command to edit said travel record.

27. The medium of claim 26, further comprising programming to authenticate a user prior to acceptance of said command.

28. The medium of claim 19, further comprising a report generation process.

* * * * *